Patented Dec. 15, 1931

1,836,427

UNITED STATES PATENT OFFICE

WILLIAM H. ALLEN, WILLIAM A. GALE, AND CHARLES F. RITCHIE, OF TRONA, CALIFORNIA, ASSIGNORS TO AMERICAN POTASH & CHEMICAL CORPORATION, OF TRONA, CALIFORNIA, A CORPORATION OF DELAWARE

PROCESS OF PRODUCING SODIUM BICARBONATE AND SODIUM SULPHATE DEKAHYDRATE FROM MIXTURES OF SODIUM SULPHATE AND SODIUM CARBONATE

No Drawing. Application filed February 1, 1930. Serial No. 425,204.

This invention relates to a process for the production of sodium bicarbonate from mixtures of sodium sulphate and sodium carbonate which may also include sodium chloride and for the production of sodium sulphate from said mixtures. The mixtures or complexes of salts to be treated may exist either in the form of solution as in the case of various natural or artificial brines, or in the solid state, as in the case of the double salt burkeite ($Na_2CO_3.2Na_2SO_4$), or mechanical mixtures of various salts.

In the past it has been well known that the sodium bicarbonate can be precipitated from solutions containing sodium carbonate by carbonating the solutions preferably in a countercurrent manner, and it has been known that the presence of other alkali metal salts is of value in this precipitation operation because of the fact that they depress the solubility of the sodium bicarbonate to be formed. It has been suggested to produce sodium bicarbonate from solutions of mixtures or complexes of sodium sulphate, sodium carbonate and sodium chloride by carbonating a solution of the complexes so as to precipitate sodium bicarbonate. It has been found that the sodium bicarbonate so produced contains an appreciable content of sodium sulphate which in many cases cannot be removed from the sodium bicarbonate even by prolonged washing. We conclude from this fact that sodium sulphate precipitates under some conditions with sodium bicarbonate as a mixed crystal or double salt or is occluded mechanically with the bicarbonate crystals. On the other hand, we have found that other sodium salts such as, for example, sodium chloride, even when present in the solution in concentrated form, do not precipitate with the bicarbonate crystals and may be readily removed from the bicarbonate crystals by washing.

It is the general object of the present invention to provide a process for producing sodium bicarbonate from complex mixtures of sodium carbonate, sodium sulphate and sodium chloride which process shall produce and precipitate a sodium bicarbonate substantially free of sodium sulphate.

It is a further object of the present invention to provide a process of producing sodium bicarbonate from complexes of sodium carbonate, sodium sulphate and sodium chloride by means of which the yield of bicarbonate obtained will be greater than that which is attainable by the processes heretofore suggested for that purpose.

It is a further object of this invention to provide a process of producing sodium bicarbonate from complexes of sodium sulphate, sodium carbonate and sodium chloride which is adapted to recover sodium sulphate in a pure form from the complex while at the same time providing sodium bicarbonate free of sodium sulphate and also at the same time to provide a greater yield of sodium bicarbonate.

In our copending application entitled "Process of separating sodium salts from mixtures thereof" we have described a method of manipulating such mixtures for the recovery of sodium sulphate, sodium chloride and sodium carbonate. The present invention is concerned with an adaptation of said process for the purpose of recovering sodium sulphate and sodium bicarbonate from such mixtures.

In the evaporation and manipulation of brines such as those obtained from Searles and Owens Lakes, California, for the recovery of potash and borax, large quantities of sulphate-carbonate complexes and mixtures are obtained and it is in the utilization of these materials that the process of this invention is of special value.

The process of the present invention will best be understood from the description of a preferred form or example of the process embodying the invention. We have therefore hereinafter described a process of the present invention as it is adapted for treatment of such complexes of sodium carbonate, sodium sulphate and sodium chloride as are obtained in processing of Searles and Owens Lakes brines for the production of potash and borax. It is to be understood, however, that the process may be utilized for the treatment of various other complexes and concentrated solutions.

In the preferred process of the invention we employ what is termed as "clarifier salts" and which possess substantially the following composition:

| | Per cent |
|---|---|
| Sodium sulphate $Na_2SO_4$ | 35.8 |
| Sodium carbonate $Na_2CO_3$ | 41.2 |
| Sodium chloride NaCl | 23.0 |

The composition of this clarifier salt may at times vary over somewhat wide limits. The clarifier salt consists principally of burkeite and some free sodium carbonate monohydrate, together with common salt or sodium chloride.

The obvious or amateur method for obtaining sodium bicarbonate from such a salt mixture would consist in dissolving the same to complete saturation in water and subsequently precipitating the bicarbonate by carbonating the solution. A solution so obtained would possess approximately 150 grams of sodium sulphate, 173 grams of sodium carbonate and 96 grams of sodium chloride per liter, or expressed in percentage, 11.4 percent of sodium sulphate, 13.1 percent sodium carbonate and 7.3 percent sodium chloride. The sulphate content of such a solution is so high that when the same is carbonated there is generally found in the precipitated bicarbonate a material sulphate content which cannot be removed by prolonged washing. Generally, the process of the present invention is directed to the reduction of the sodium sulphate content of the material to be processed and to the replacement of the same with sodium chloride before attempting to precipitate bicarbonate. In this manner not only the sodium sulphate is prevented from precipitating with the bicarbonate but because sodium chloride has a greater solubility depressing effect upon sodium bicarbonate than that possessed by sodium sulphate, an increased yield of sodium bicarbonate can be obtained.

To recover the sodium sulphate from the stated salt mixture or ones of similar composition and to replace the same with sodium chloride, the procedure is similar to that described and claimed in our copending application previously referred to. For this purpose the salt mixture is first leached for the purpose of removing its sodium chloride content if it contains an appreciable quantity of this salt. The process of the present invention is a cyclic one and in the preferred process the leaching is accomplished by the solution attained in the manner hereafter to be described so that the chloride content of the salts to be treated is placed back in the solution. The solution employed for leaching may be termed a "hot sulphate liquor". This solution has been previously saturated with Glauber salt and sal soda, dekahydrates of sodium sulphate and sodium carbonate, respectively, at a temperature just below or substantially at the temperature of the transition point between these hydrated salts to the anhydrous double salt burkeite $$(Na_2CO_3 \cdot 2Na_2SO_4).$$

This solution is heated to say, for example, 50 degrees C. for performing the leaching operation. The temperature employed is not critical. Various temperatures in excess of 25 degrees C. may be used.

Sufficient of the solution is employed to leach substantially all of the sodium chloride content from the complex. Since the leaching solution is saturated with respect to burkeite, the burkeite content of the complex remains undissolved. A part also of the excess or free sodium carbonate monohydrate of the complex is dissolved by the solution and all of the free or excess sodium carbonate monohydrate may be dissolved by adding hot water or other suitable liquors to the leaching solution during this operation.

As hereafter more particularly explained, this leaching operation causes burkeite to be precipitated from the leaching solution so that the burkeite content of the complex has added to it burkeite from the leaching solution. The burkeite thus attained is substantially free of sodium chloride.

The burkeite is separated from the solution and is then dissolved in cold water. In case the hot leaching step employing the cold sulphate liquor was insufficient for the removal of essentially all of the sodium chloride in the original salt then a further leaching of the separated salts with hot water may be applied, for it is important to the efficiency of the process that the sodium chloride content of the complex be substantially removed before the complex is dissolved.

This sodium chloride-free salt now comprising largely the double salt burkeite and its homologues is dissolved in water at some temperature, for example, 25 degrees C., below the transition point of sodium sulphate dekahydrate and sodium carbonate dekahydrate to the anhydrous double salt burkeite. In a solution free of sodium chloride this transition point is approximately at 25 degrees C. and the solution is preferably made at a temperature nearly corresponding thereto but usually slightly thereunder. The ratio of solid salt to water employed is selected so as to produce a solution which will dissolve all of the sodium carbonate content of the salt and become saturated essentially with respect to sodium carbonate dekahydrate and sodium sulphate dekahydrate. The dissolving operation brings about an appreciable precipitation of Glauber salt or sodium sulphate dekahydrate. In this manner the ratio of carbonates to sulphate in the produced solution is greater than that in the salts to be processed. Upon reaching saturation at this point the precipitated Glauber salt is filtered or otherwise separated from the liquor which is now the so-called "cold sulphate liquor" previously referred to. The separated Glauber salt may be sold as such or be converted into anhydrous sodium sulphate by any one of several well-known methods and provides a valuable article of commerce. Approximately 90% of the sulphate in the original mixture is thus recovered.

The cold sulphate liquor at 25 degrees C. contains a large quantity of sodium sulphate and sodium carbonate,—approximately 18% $Na_2CO_3$ and 16% $Na_2SO_4$. This composition should be compared with that of the composition of the solution which is attained when the original salts or complexes are dissolved directly in water, in which case only about 13% $Na_2CO_3$ will exist in the solution. Since the recovery efficiency of a bicarbonate precipitating process depends directly upon the concentration of sodium carbonate in the solution to be carbonated, it is apparent that this cold sulphate solution is a superior solution to that ordinarily derived by direct dissolution to produce bicarbonate. Accordingly, in one form of the present invention we proceed directly to carbonate this cold sulphate liquor for the precipitation of sodium bicarbonate.

In the preferred form of the present invention we subject the liquor to further operations before carbonating in order to further decrease the sodium sulphate content of the liquor. Thus, in the preferred form of the present invention this cold sulphate liquor is heated to a temperature above the transition temperature between dekahydrates of sodium carbonate and sodium sulphate to the anhydrous salt burkeite, for example, to 50 degrees C.

The sulphate liquor is then to be saturated with respect to sodium chloride. The saturation with sodium chloride causes the precipitation of a large amount of burkeite from the sulphate liquor and thus by removing sulphate from the liquor, increases materially the ratio of carbonates to sulphates in the liquor. As previously pointed out, the operation of saturating the sulphate liquor with sodium chloride may include the leaching of the original salts to free these original salts from sodium chloride. In certain cases the chloride content of the original salts may be sufficient to provide all the sodium chloride necessary for saturating the sulphate liquor. In other cases additional sodium chloride may be added for this purpose.

The liquor resulting from this precipitation of burkeite we call "hot carbonate liquor" and contains, for example, when prepared at 50° C., 1.4 percent $Na_2SO_4$, 13.6 percent $Na_2CO_3$, and 17.1 percent NaCl. It can be seen that this treatment reduces the sodium sulphate content to a very low value and that the sodium sulphate so removed is in the process nearly all made available as essentially pure Glauber salt from which a satisfactory grade of anhydrous sulphate may be manufactured easily.

The resulting hot carbonate liquor essentially saturated with sodium chloride, sodium carbonate monohydrate and burkeite and essentially free of all suspended solids, is employed for the production of sodium bicarbonate. The solubility of sodium bicarbonate in this liquor is less than the solubility of sodium bicarbonate in liquor which contains sodium sulphate in place of sodium chloride and therefore sodium bicarbonate can be precipitated from this liquor with increased efficiency. In precipitating sodium bicarbonate any usual or preferred well known method of countercurrent carbonation may be employed. Preferably, the liquor is subjected to the action of carbon dioxide bearing gas under pressure in a countercurrent manner in order to obtain the usual advantages of bringing the liquor most nearly completely carbonated in contact with the strongest gas, while the weakest gas is caused to come in contact with the liquor containing the least amount of sodium bicarbonate. The carbon dioxide containing gas may be attained from any source, usually being a mixture of a lime kiln gas plus the gas from a calciner decomposing sodium bicarbonate to soda ash. For example, the carbon dioxide gas may contain 40 to 60% $CO_2$ and is passed into the hot carbonate liquor at a pressure of from 30 to 60 pounds per square inch gauge. Any usual suitable gas distributing means may be employed, such as porous plates, stationary or moving wire screens, revolving perforated inlet pipes, etc.

The carbonation operation may take place in a single chamber or the liquor and carbon dioxide bearing gas brought in contact with each other in a plurality of successive chambers from which by pipes, the liquor and carbon dioxide are transferred counter-currently.

It is also preferable in the carbonating operations to partially cool the liquor which may take place simultaneously with the carbonating operation or it may be conducted at the end of the carbonating operation. Because of the fact that the carbonating reaction is exothermic it is preferable to cool during the carbonating operation. The final temperature to which the solution is to be cooled may be, for example, between 20 and 35° C. However, any extended cooling may be employed as long as the liquor is not cooled below the precipitation point of sodium chloride or sodium sulphate. It is preferable to conduct the major portion of the carbonating while the liquor is still hot and to cool the liquor during the end of the carbonating operation.

Only about 2.6 per cent of sodium bicarbonate remains in the fully carbonated liquor at 20° C. and hence by this method of operation from 85 to 90 percent of the soda values of the original material may be recovered in the form of sodium bicarbonate. This constitutes a very good recovery for this type of process. The sodium bicarbonate precipitated during the carbonating operation may be passed as a sludge to suitable filters or to centrifugal separators for separating the precipitate. The precipitate is preferably washed with a small amount of water.

The sodium bicarbonate produced may be used for any desired purpose, its most common use being for the manufacture of soda ash. To this end the washed precipitate is then dried and calcined for the removal of carbon dioxide. The carbon dioxide removed may be employed for a further treatment of hot carbonate liquors as hereinbefore set forth.

The process thus described is a cyclic process and may include various variations in which the starting material of the process is of different composition than the particular one specified in the foregoing example.

Thus, if the starting material possesses a carbonate to sulphate ratio less than that of a solution at the transition point between sodium carbonate dekahydrate and Glauber salt to burkeite, then the material is introduced into the cycle preferably in the operation where the material is first digested in water in the Glauber salt field so as to precipitate Glauber salt and change the carbonate to sulphate ratio to that of a solution at said transition point. If the raw material constitutes a complex or solution having a carbonate to sulphate ratio higher than that of a solution at said transition point, then the material is introduced in the process in that operation in which the solution is employed for precipitating burkeite, i. e., the first operation on the solution is that the solution is then saturated with sodium chloride for the precipitation of burkeite with or without the addition of further solutions from the complete cycle. The first operation of digesting burkeite in the Glauber salt field is still utilized in such a process because the burkeite precipitated from this operation is sent through the first mentioned operation.

These various modifications of the process can be carried out in each of which the raw material to be processed is started in the cycle at that point of the cycle where the solution operated upon corresponds to the raw material utilized.

While the particular process herein described is well adapted to carry out the objects of the present invention, it is to be understood that various modifications and and changes may be made without departing from the spirit of the invention, and the invention is of the scope as set forth in the appended claims.

We claim:

1. A process of treating sodium carbonate-sodium sulphate complexes which comprises, heating the solution of the complex to a temperature above the transition point of sodium carbonate and sodium sulphate to the double salt burkeite, which solution or complex contains a greater ratio of sodium carbonate to sodium sulphate than the ratio of these salts in burkeite, then adding sodium chloride to the solution in sufficient quantities to depress the solubility of burkeite in the solution, and causing the solution to precipitate burkeite and materially increase the ratio of carbonate to sulphate, and finally carbonating the solution to precipitate sodium bicarbonate.

2. A process of treating sodium carbonate-sodium sulphate complexes which comprises, heating a solution of the complex containing a greater ratio of carbonate to sulphate than the ratio of these constituents in burkeite to a temperature substantially above the transition point of sodium carbonate and sodium sulphate to the double salt burkeite, adding sodium chloride to the solution to nearly saturate the same therewith and precipitate burkeite from the solution, the solution operated upon containing a ratio of carbonate to sulphate sufficiently high so that such precipitation of burkeite brings the composition of the solution nearly to saturation with sodium carbonate monohydrate, and then carbonating the solution to precipitate sodium bicarbonate.

3. A process of treating sodium carbonate-sodium sulphate complexes which comprises, heating a solution of the complexes to a temperature substantially above the transition point of sodium carbonate and sodium sulphate to the double salt burkeite, which solution contains a carbonate-sulphate ratio substantially corresponding to the ratio of carbonate to sulphate of a solution at said transition point, substantially saturating the solution with sodium chloride, thereby precipitating burkeite, and finally carbonating the solution to precipitate sodium bicarbonate.

4. A process of treating sodium carbonate-sodium sulphate complexes which includes the following cycle of operations: digesting a complex of sodium carbonate-sodium sulphate within the Glauber salt field while precipitating Glauber salt and producing a solution near the composition of a solution at the transition point between sodium carbonate dekahydrate, Glauber salt and burkeite, then heating the solution to a temperature substantially above the temperature of said transition point, and saturating the solution with sodium chloride to precipitate burkeite, and finally carbonating the solution to precipitate sodium bicarbonate.

5. A process of producing sodium bicarbonate from sodium carbonate-sodium sulphate complexes which includes, digesting a complex of sodium carbonate-sodium sulphate within the Glauber salt field while precipitating Glauber salt and producing a solution near the composition of the transition point between sodium carbonate dekahydrate, Glauber salt and burkeite, and finally carbonating to precipitate sodium bicarbonate.

6. A process of treating sodium carbonate-sodium sulphate complexes which includes the following cycle of operations: digesting a complex of sodium carbonate-sodium sulphate within the Glauber salt field while precipitating Glauber salt and producing a solution near the composition of the transition point between sodium carbonate dekahydrate, Glauber salt and burkeite, then heating the solution to a temperature substantially above the temperature of said transition point, and saturating the solution with sodium chloride to precipitate burkeite, and then carbonating the solution to precipitate sodium bicarbonate, the burkeite being precipitated being recycled to the digesting operation.

7. A process of treating sodium carbonate-sodium sulphate complexes which comprises, heating a solution of the complexes to a temperature substantially above the transition point of sodium carbonate and sodium sulphate to the double salt burkeite, which salts contains a carbonate-sulphate ratio substantially corresponding to the ratio of carbonate to sulphate of a solution at said transition point, substantially saturating the solution with sodium chloride, thereby precipitating burkeite, the saturation of the solution with sodium chloride being effected by adding a mixture of sodium chloride and burkeite in just sufficient quantities so that substantially all of the sodium chloride content of the mixed salt is dissolved in saturating the solution, and carbonating the solution to precipitate sodium bicarbonate.

8. A process of separating sodium carbonate-sodium sulphate complexes which comprises the following cycle of operations: dissolving a complex of sodium carbonate and sodium sulphate in such relative proportions and at such temperature that the solution becomes saturated with Glauber salt before complete solution of the carbonate and sulphate, then precipitating burkeite from the solution, carbonating the solution to precipitate sodium carbonate, and cooling the solution during carbonating operations, the burkeite precipitated being separated and recycled to the first operation.

9. A cyclical process of treating complex mixtures of sodium carbonate, sodium chloride and sodium sulphate which comprises digesting a complex mixture of sodium carbonate and sodium sulphate, essentially free of sodium chloride in water while maintaining the system at a temperature below the transition point of Glauber salt and sal-soda to the anhydrous double salt burkeite, precipitating Glauber salt while forming a solution essentially saturated with Glauber salt and sal-soda at said temperature, separating Glauber salt from said solution, heating the solution to a temperature above said transition point, treating a complex mixture of sodium carbonate, sodium chloride and sodium sulphate with said liquor, bringing the system to saturation with sodium chloride, thereby precipitating a substantial portion of the sodium sulphate in the liquor as burkeite and forming a hot carbonate liquor, separating the solid residue from the hot carbonate liquor, returning said residue substantially freed of sodium chloride to the cold water digesting step of the process, passing the hot carbonate liquor to a counter-current carbonation system, precipitating sodium bicarbonate from the hot carbonate liquor, cooling the liquor in the last stages of carbonation to further precipitate pure sodium bicarbonate and finally separating said sodium bicarbonate from the enveloping liquid.

10. A process of producing Glauber salt and sodium bicarbonate from carbonate sulphate complexes, said complexes containing a less ratio of carbonate to sulphate than is found in a liquor saturated substantially at the transition point between the hydrates of sodium sulphate and sodium carbonate to anhydrous double salt burkeite which comprises digesting said complexes in an aqueous solvent substantially free of sodium chloride at a temperature substantially that of said transition point, the proportions of water and the complex being such that the resulting solution will be practically saturated with respect to the hydrates of sodium carbonate and sodium sulphate at said transition temperature, separating the precipitated Glauber salt from the produced solution, and thereafter carbonating the liquor to precipitate sodium bicarbonate.

11. A cyclical process of treating complex mixtures of sodium carbonate sodium chloride and sodium sulphate, which comprises digesting a complex mixture of sodium carbonate and sodium sulphate essentially free of sodium chloride in water, while maintaining the system at a temperature below the transition point of the hydrated salts of sodium carbonate and sodium sulphate to the anhydrous double salt burkeite, precipitating Glauber salt and sal-soda at said temperature, separating Glauber salt from the resulting mixture, treating a complex mixture of sodium carbonate, sodium sulphate and sodium chloride with said solution, said complex mixture containing less sodium chloride, separating the solid residue from the resulting mixture, returning said residue substantially freed of sodium chloride to the cold water digesting step of the process, and thereafter passing carbon dioxide through the filtrate to precipitate sodium bicarbonate.

Signed at Trona, California, this 18th day of January, 1930.

WM. H. ALLEN.
WILLIAM A. GALE.
CHARLES F. RITCHIE.